United States Patent
Curin et al.

(10) Patent No.: US 10,146,747 B2
(45) Date of Patent: Dec. 4, 2018

(54) TEXT BROWSING, EDITING AND CORRECTION METHODS FOR AUTOMOTIVE APPLICATIONS

(71) Applicant: Nuance Communications, Inc., Burlington, MA (US)

(72) Inventors: Jan Curin, Prague (CZ); Jan Kleindienst, Nove Straseci (CZ); Martin Labsky, Prague (CZ); Tomas Macek, Prague (CZ); Lars Köenig, Ulm (DE); Holger Quast, Merelbeke (BE); Garrett Weinberg, Arlington, MA (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 0 days.

(21) Appl. No.: 15/402,482

(22) Filed: Jan. 10, 2017

(65) Prior Publication Data

US 2017/0147536 A1  May 25, 2017

Related U.S. Application Data

(63) Continuation of application No. 14/119,282, filed as application No. PCT/US2011/037535 on May 23, 2011, now Pat. No. 9,575,946.

(51) Int. Cl.
*G06F 17/20* (2006.01)
*G06F 17/21* (2006.01)
(Continued)

(52) U.S. Cl.
CPC ............ *G06F 17/214* (2013.01); *B60K 35/00* (2013.01); *G06F 3/04812* (2013.01);
(Continued)

(58) Field of Classification Search
None
See application file for complete search history.

(56) References Cited

U.S. PATENT DOCUMENTS

| | | | |
|---|---|---|---|
| 4,922,448 A | 5/1990 | Kunieda et al. | |
| 5,829,000 A | 10/1998 | Huang et al. | |

(Continued)

FOREIGN PATENT DOCUMENTS

| | | |
|---|---|---|
| EP | 0 180 047 A2 | 5/1986 |
| WO | WO 99/35008 | 7/1999 |
| WO | WO 2009/040643 A2 | 4/2009 |

OTHER PUBLICATIONS

PCT International Search Report and Written Opinion dated Nov. 20, 2012 corresponding to International Application No. PCT/US2011/037535; 17 Pages.

(Continued)

*Primary Examiner* — Keith D Bloomquist
(74) *Attorney, Agent, or Firm* — Daly, Crowley, Mofford & Durkee LLP

(57) ABSTRACT

An automotive text display arrangement is described which includes a driver text display positioned directly in front of an automobile driver and displaying a limited amount of text to the driver without impairing forward visual attention of the driver. The arrangement may include a boundary insertion mode wherein when the active text position is an active text boundary, new text is inserted between the text items separated by the active text boundary, and when the active text position is an active text item, new text replaces the active text item. In addition or alternatively, there may be a multifunctional text control knob offering multiple different user movements, each performing an associated text processing function.

21 Claims, 3 Drawing Sheets

(51) Int. Cl.
    *B60K 35/00*     (2006.01)
    *G06F 17/24*     (2006.01)
    *G06F 3/0481*    (2013.01)

(52) U.S. Cl.
    CPC ............ *G06F 17/211* (2013.01); *G06F 17/24* (2013.01); *B60K 2350/102* (2013.01); *B60K 2350/1044* (2013.01); *B60K 2350/1068* (2013.01)

(56) References Cited

U.S. PATENT DOCUMENTS

| | | | |
|---|---|---|---|
| 6,292,176 B1 | 9/2001 | Reber et al. | |
| 2002/0148317 A1 | 10/2002 | Onodera | |
| 2005/0012710 A1* | 1/2005 | Hayward | G06F 3/0362 345/156 |
| 2006/0012584 A1* | 1/2006 | Vassallo | G06F 3/0362 345/184 |
| 2006/0206816 A1 | 9/2006 | Nordenhake | |
| 2008/0055241 A1* | 3/2008 | Goldenberg | G06F 3/016 345/156 |
| 2008/0079753 A1* | 4/2008 | Victor | B60Q 9/008 345/660 |
| 2008/0158510 A1* | 7/2008 | Tant | B60K 35/00 353/14 |
| 2009/0079712 A1* | 3/2009 | Levin | G05G 9/047 345/184 |
| 2009/0259357 A1* | 10/2009 | Aoki | B60K 37/06 701/31.4 |
| 2012/0110493 A1* | 5/2012 | Cabral | G06F 3/0219 715/773 |
| 2012/0179325 A1* | 7/2012 | Faenger | B60K 35/00 701/31.4 |
| 2013/0127609 A1* | 5/2013 | Sitarski | B60R 1/00 340/438 |

OTHER PUBLICATIONS

PCT International Preliminary Report dated Dec. 5, 2013 corresponding to International Application No. PCT/US2011/037535; 11 Pages.
U.S. Non-Final Office Action dated Jul. 24, 2015 corresponding to U.S. Appl. No. 14/119,282; 11 Pages.
Response to U.S. Non-Final Office Action dated Jul. 24, 2015 corresponding to U.S. Appl. No. 14/119,282; Response filed Oct. 20, 2015; 10 Pages.
U.S. Final Office Action dated Dec. 23, 2015 corresponding to U.S. Appl. No. 14/119,282; 12 Pages.
Response to U.S. Final Office Action dated Dec. 23, 2015 corresponding to U.S. Appl. No. 14/119,282; Response filed Mar. 23, 2016; 8 Pages.
U.S. Advisory Action dated Apr. 20, 2016 corresponding to U.S. Appl. No. 14/119,282; 4 Pages.
U.S. Non-Final Office Action dated May 9, 2016 corresponding to U.S. Appl. No. 14/119,282; 10 Pages.
Response to U.S. Non-Final Office Action dated May 9, 2016 corresponding to U.S. Appl. No. 14/119,282; Response filed Sep. 9, 2016; 10 Pages.
U.S. Final Office Action dated Oct. 4, 2016 corresponding to U.S. Appl. No. 14/119,282; 10 Pages.
Response to U.S. Final Office Action dated Oct. 4, 2016 corresponding to U.S. Appl. No. 14/119,282; Response filed Oct. 12, 2016; 7 Pages.
U.S. Notice of Allowance dated Oct. 24, 2016 corresponding to U.S. Appl. No. 14/119,282; 5 Pages.
European Examination Report dated Apr. 13, 2018 for European Application No. 11722702.5; 5 Pages.
European Examination Report dated Aug. 14, 2017 for European Application No. 11722702.5; 5 pages.
Response to European Examination Report dated Aug. 14, 2017 for European Application No. 11722702.5; Response filed Dec. 14, 2017; 5 Pages.

\* cited by examiner

TEXT BROWSING, EDITING AND CORRECTION METHODS FOR AUTOMOTIVE APPLICATIONS

CROSS REFERENCE TO RELATED APPLICATIONS

This application is a continuation of U.S. patent application Ser. No. 14/119,282 filed on Nov. 21, 2013, entitled "TEXT BROWSING, EDITING AND CORRECTION METHODS FOR AUTOMOTIVE APPLICATIONS," which claims the benefit of a U.S. National Stage of PCT Application No. PCT/US2011/037535 filed on May 23, 2011, entitled "TEXT BROWSING, EDITING AND CORRECTION METHODS FOR AUTOMOTIVE APPLICATIONS," which applications are hereby incorporated herein by reference in its entirety.

TECHNICAL FIELD

The present invention relates to a text display and processing arrangement for automobiles.

BACKGROUND ART

There can be a lot happening in the passenger compartment of a modern automobile. Although the driver's full attention is needed for the task of driving safely, there can be many distractions in forms such as complex entertainment systems, electronic navigation systems and their colorful displays and text-to-speech (TTS) audio outputs, smart phones, email devices, all of which now can be controlled by automatic speech recognition (ASR). There is a need to minimize these distractions to preserve the driver's attention to the road ahead.

While operating such in-car devices, most distraction seems to be visual—caused by the driver looking at the operated device (its screen, buttons etc.). In the specific case of automotive ASR, some systems allow processing of the recognized text completely without a display, relying on audio output only, while other systems use a display showing the full edited text. Eyes-free text composition without a text display generally leads to lower distraction levels as compared to ASR systems that use a text display, but more errors may remain in the composed text that go unnoticed by the user. This can be due, for example, to different words sounding alike when spoken by a speech synthesizer. It may be possible to offset this problem, for example, by using an automatic audio output disambiguation method, but under some circumstances it may still be worthwhile to show to the driver a limited content text display.

When entering, navigating and editing text in text processing applications such as ASR systems, the most frequent user interface operations typically are mapped directly to physical controls such as dedicated buttons or rotary knobs. Other operating functions can be activated by traversing and selecting from menus, which substantially increases visual and cognitive load. Other user control mechanisms can include recognizing handwritten gestures (e.g., using a touchpad) or recognizing voice commands. One advantage of dedicated physical controls is their robustness to any kind of noise and their low visual and cognitive distraction potential. But there can only be so many physical controls in actual automotive setups before the dashboard becomes too complex.

One of the application control functions in a text processing application, such as processing ASR text, is control of the text insertion point—the cursor. There are two main cursor modes which can be thought of as "insert-after" and "replace."

The insert-after mode can be described in the context of an audio playback arrangement—typically produced by a text-to-speech (TTS) system which always reads aloud the active text item when the active text item changes, e.g. during navigation among items or after entering new text. This way, the text last pronounced by the system, such as "please buy bananas," is naturally followed by the user's dictation, e.g., "and oranges." This holds as well for other input modalities such as handwriting recognition. Insert-after mode is a natural choice when operating an eyes-free text processing system without a text display, or with a system using a text display that shows the complete dictated text. In the former case, the user maintains a "mental cursor" at the point just after the text last dictated. In the latter case, the display and behavior resembles word processing and e-mail programs with which users are already familiar, and that by default implement an insert-mode cursor.

The replace mode insertion point cursor is an alternative to insert-after mode. New input text such as new dictation results replaces the active text item (except maybe at the beginning or end of the entire text where artificial beginning- and end-of-message markers may be placed). Under certain conditions, replace mode may be more natural than insert-after mode; for instance, when a display is used that only shows the active text item. Replace mode offers the benefit that replacing a whole active text item by re-dictating is quicker than in the insert-after mode where the user first needs to delete the old text. One drawback of replace mode is that the insertion of new text inside a block of existing text requires either a switch to insert mode or the use of a voice command such as "Insert <new text>".

Both cursor insertion modes require the user to understand which mode is being used. If user expectations do not match the editing mode, undesired pieces of text may accidentally remain part of the message in insert-after mode, and intended text may be accidentally deleted in replace mode. This can be offset by: (1) not switching these cursor modes dynamically, but rather deciding to use only one of the modes in a deployed system; (2) sufficient user feedback indicating what is happening when new text is inserted into existing text (e.g. TTS announcing that an original text item has been replaced under replace mode); or (3) getting the user accustomed to which mode is active at which time.

SUMMARY

Embodiments of the present invention are directed to an automotive text display arrangement which includes a driver text display positioned directly in front of an automobile driver and displaying a limited amount of text to the driver without impairing forward visual attention of the driver. The text display may use a larger font for displaying a current active word than for other words. The limited amount of text may include an active text word and two or fewer words before and after the active text word. The text display may further display a text cursor indicating a current text processing focus position. The display of text may be user controllable and/or controllable by a text processing application in communication with the driver text display.

The text display arrangement may also include a secondary display positioned to one side of the driver providing additional information regarding the text in the driver text display. For example, the additional information may include additional text associated with tile displayed text in the driver text display, user selectable text editing tools available to edit the displayed text, and/or system status indicators showing operational status of the text display arrangement.

Embodiments of the present invention also include a text editing interface (such as a text display in an automobile cabin) for presenting a text segment having a sequence of text items separated by text boundaries and an active position where new text is inserted. When the active position is an active text boundary, new text is inserted between the text items separated by the active text boundary. When the active position is an active text item, new text replaces the active text item.

The text segment may include text boundaries at the beginning and end of the text segment. The active position may be an active text boundary selected by a user navigation operation that changes the active position after a non-navigation operation. Or the active position may be an active text boundary selected by a second user navigation operation that changes the active position after a first user navigation operation in a different direction. The active position may be an active text boundary after insertion of new text into an existing text segment. The active position may be visually highlighted by the text editing interface. The text items may include multi-word text phrases, individual words, and/or text letters.

Embodiments of the present invention also include an automotive speech application text display arrangement which includes a text display in an automobile cabin for displaying a speech recognition text segment having a sequence of speech recognition text items separated by text boundaries and an active position where new text is inserted, and a multifunctional text control knob offering multiple user movements, each movement performing an associated text processing function.

The user movements may include one or more of a scrolling movement to navigate the active position within the text segment; a single short push movement to delete text at the active position; a double short push movement to switch size of the navigated/edited text items between phrase, word and character; a stationary long push movement while not scrolling to undo an immediately previous text processing operation; and a scrolling and pushing movement to replace text at the active position with alternate text.

Specific such embodiments may also have a push-to-talk (PTT) button that is pressable to enable voice input associated with the text display arrangement. The push-to-talk button may further accept a long push movement to switch size of the navigated/edited text items between phrase, word and character.

DETAILED DESCRIPTION

Various embodiments of the present invention are directed to user interface techniques for automotive text processing applications such as automotive ASR systems to enable safe and easy means for entering and correcting text in an eyes-busy environment. While these methods were designed for an automotive environment, they may also be applied to other situations where composing text is a secondary task, such as in a hospital operating room or an aircraft, maintenance facility. These techniques and arrangements are easy to use and help keep the user's cognitive load below a dangerous threshold during the entire task with minimal task completion time and maximal quality of entered text. Thus, the specific examples of text displays described herein may also be abstracted into the more general notion of text editing interfaces, such as TTS-based text editing interfaces.

For example, one embodiment of the present invention contributes to the above safety and usability goals by providing two useful text display views: Strip View and Dual View, which are closely related and directed to minimizing visual distraction of the driver. Strip View is a visual user interface (UI) technique that presents to the user only a highly limited display of the most relevant pieces of entered text. Strip View reduces visual distraction by minimizing the duration of gazes at the display by only showing a few words at a time. There is just a single row of text so the display can be incorporated into the main instrument cluster directly in front of the driver rather than in the center stack vertical console located between the driver and front passenger foot wells. There is less visual distraction because the driver's gaze only needs to travel as far as the instrument cluster without impairing forward visual attention of the driver. Moreover, with proper auditory feedback (including TTS speaking navigated text items and announcing effects of user actions) the amount of gazes at the display can be reduced to minimum or none.

Figure 1A:
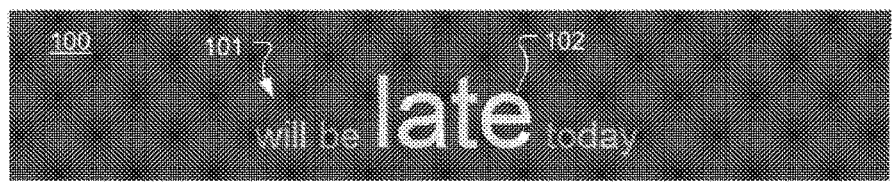
FIG. 1A-E shows an example of a text editing interface using a limited text display (called Strip View) according to an embodiment of the present invention.

FIG. 1A-E shows an example of a text editing interface in the form of a Strip View limited text display according to an embodiment of the present invention. The driver text display 100 displays a single text line 101 showing a single active text item 102 (at center) and its immediate context. For the sentence "Sorry, I will be late today," FIG. 1A shows the word "late" as the active text item 102. In this example, the length of the left context of the text line 101 is set to two words and the length of the right context to one word. The active text item 102 is selected/focused either by the user's browsing the entered text using tactile input devices (such as the multifunctional knob described below or buttons mounted on the steering wheel), or it is automatically synchronized with synthesized speech played back by the system (e.g., while reading out the last chunk of recognized text). In the embodiment shown, the active text item 102 is displayed in a larger font than the context text on either side.

Figure 1B:
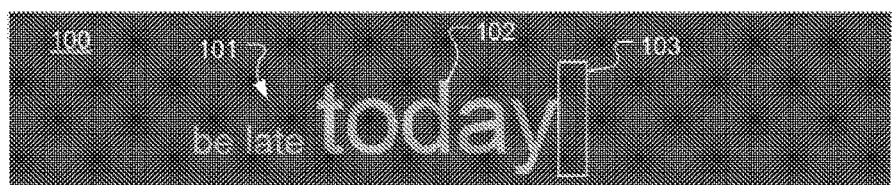
Figure 1C:
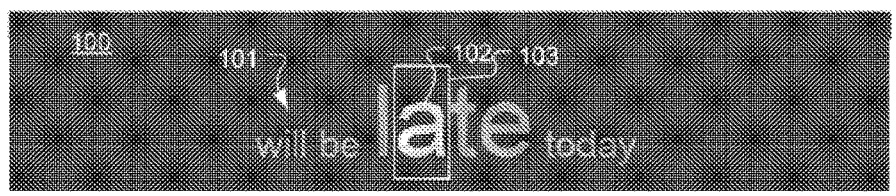
Figure 1D:
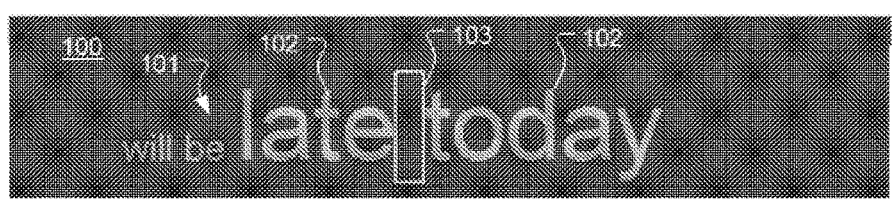
Figure 1E:
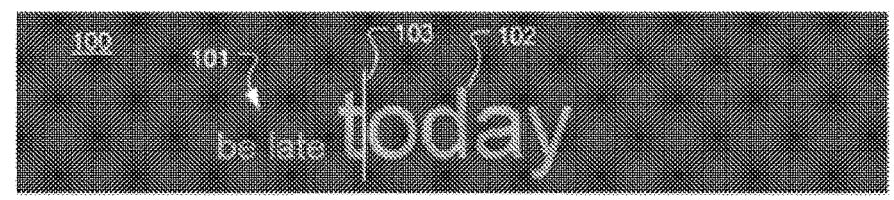

In FIG. 1B, the driver text display 100 shows a text cursor 103 indicating an active focus position, which in this case is at the end of the text line 101. FIG. 1C shows the driver text display 100 being operated in a spelling mode where individual letters can be corrected. Here the active text item 102 is the active letter "a" in the word "late," where the text cursor 103 is shown. FIG. 1D shows the driver text display 100 with the active position of the text cursor 103 being the boundary between the words "late" and "today." Note that in the present embodiment, a selected word boundary may be displayed in the same way as an active space character under spelling mode. FIG. 1F shows the driver text display 100 with the active position of the text cursor 103 being the boundary between two adjacent letters "t" and "o" under spelling mode, where the cursor needs to be of "zero length", represented by a vertical line in the present embodiment. Note that in the present embodiment, a zero-length cursor may also appear to represent an active word boundary that comprises of zero characters, e.g. between a word and a comma immediately following that word.

Figure 2:
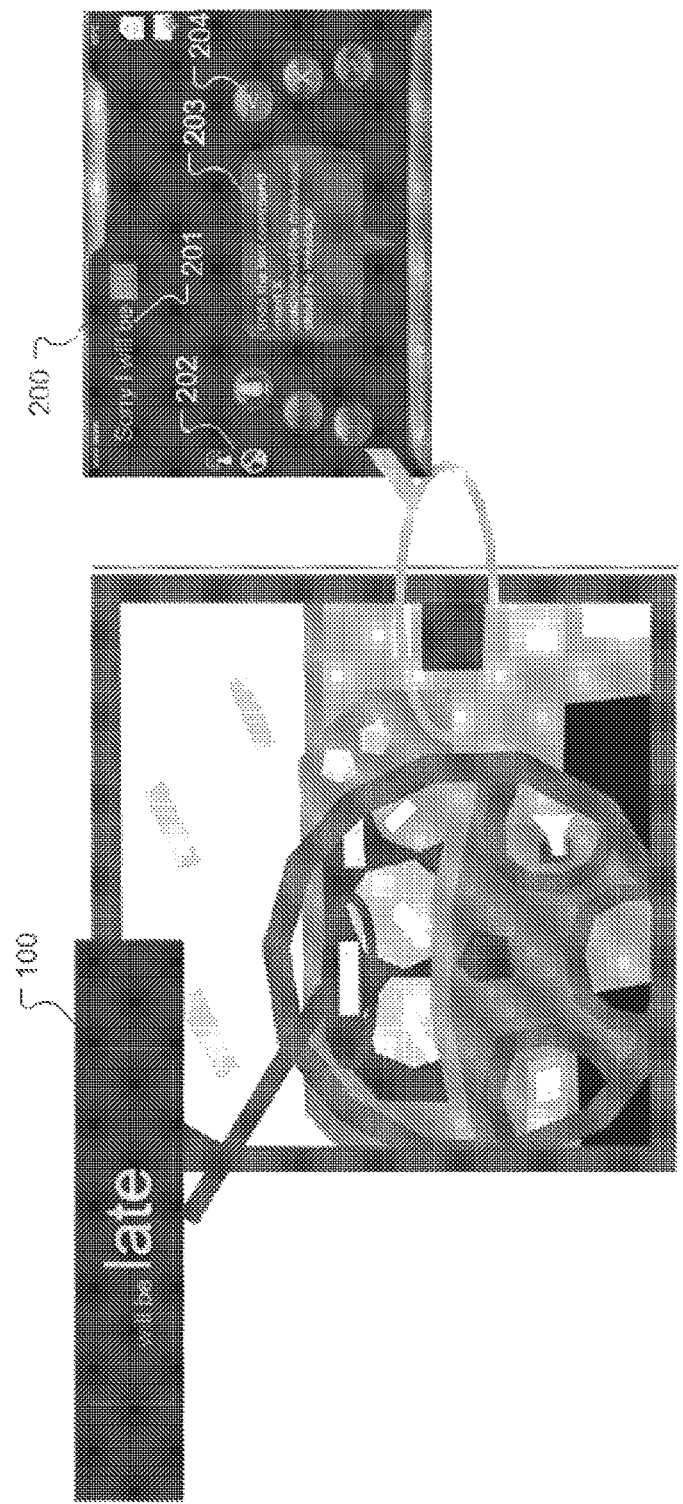
FIG. 2 shows a layout of text displays in an automobile passenger compartment according to an embodiment of the present invention.

FIG. 2 shows one specific layout of an automobile passenger compartment where the driver text display 100 is located in the main instrument cluster directly in front of the driver. In some circumstances it may be useful to present additional information to the user beyond what fits in the single text line 101 of the driver text display 100. This additional information can be displayed as shown in FIG. 2 in a secondary display 200 positioned in the center stack vertical console to one side of the driver. The secondary display 200 can provide additional information regarding the text in the driver text display 100, such as additional text associated with the text line 101 displayed in the driver text display 100. For example, the secondary display 200 may be synchronized with the driver text display 100 based on a Dual View concept so that they both display the same active text item 102, with the secondary display 200 showing the full edited text associated with limited text in the text line 101 of the driver text display 100. In such case, the secondary display 200 may highlight the active text unit as emphasized as part of the full edited text. Optionally and in addition, the secondary display 200 may also show the active text unit separately as an emphasized line of text above or below the full edited text. The secondary display 200 may also show hints and sample voice commands 203 and user selectable text editing tools 204 to edit the displayed text. The secondary display may also show system status indicators 202 showing operational status of the text display arrangement. The display of this additional information in the secondary display 200 should be arranged to minimize user distraction and not cause the user to look at it too frequently or for over-long durations.

Embodiments of the present invention also are directed at controlling the behavior of the text cursor 103 and the method of inserting text in the text line 102 in the driver text display 100. This allows the user to easily enter text either by replacing currently selected text or by inserting it in between existing text.

In conventional text editing, the active position where the cursor is located either has a zero length (the default insert cursor) or one character length (replace cursor). But in some automotive text processing applications, it may be useful to have a non-zero size active text item 102 (focused/selected) as described above, except perhaps when the active position is at the beginning or end of the edited text. In such settings, embodiments of the present invention include use of a new text insert mode known as "Boundary-Insert" mode which acts as a combination of insert mode and replace mode, retaining advantages of both original modes and obviating the need to support both and for the user to comprehend when the system is switching from one mode to the other. Specifically, boundary-insert mode behaves like replace mode except in certain circumstances when the active selection shrinks to an area comprising the boundary between the two neighboring text items. This boundary may be an inter-word space or a zero-length cursor between two adjacent characters.

Reflecting this idea, the driver text display 100 can be thought of as displaying a limited text line 101 of a text segment having a sequence of active text items 102 that are separated by text boundaries and an active position text cursor 103 where new text is inserted. When the active position of the text cursor 103 is an active text boundary, then new text is inserted between the active text items 102 separated by the active text boundary. When the active position of the text cursor 103 is an active text item 102 itself, then new text replaces the active text item 102.

For example, in specific embodiments, the boundary-insert text cursor 103 may appear when the user first navigates after a non-navigation operation, or after the user navigates in a direction opposite to the (immediately) preceding navigation. In either of these cases, the text boundary immediately to the left or right of the previously active text item 102 gets selected based on the direction of navigation. In addition or alternatively, a boundary-insert text cursor 103 may be used after the user inserts new text into existing text (e.g., by voice or handwriting). In that case, the text boundary after the newly inserted text becomes active. When a text boundary is active, new text is inserted between the active text items 102 separated by that text boundary. In word or phrase processing modes, proper spacing between the two existing active text items 102 and the new inserted text is maintained (preserving normal white space). In letter mode of operation, white space is not normalized.

An active text boundary may be visually represented in various ways. In a display showing the full edited text, such as a secondary display 200, the white space character(s) comprising the wordbreak may be highlighted in the same style as a highlighted text item. Or when the boundary between neighboring text items is of zero length (as in letter mode), a cursor represented by a vertical bar can indicate the active wordbreak.

The active boundary between two text items may be audibly indicated by a TTS system in one of the following ways (for example, for the text "Buy bananas. See you at home."):

"After 'Buy bananas'" (appropriate e.g. when navigating forward)

"Before 'See you at home'" (appropriate e.g. when navigating backward)

"Space after 'Buy bananas' and before 'See you at home'"

"Between 'Buy bananas' and 'See you at home'"

It may be useful to use different distinct voice fonts to distinguish the dictated text items front the rest of the TTS prompt.

It may further be useful to have a multifunctional text control knob offering multiple user movements, each movement performing an associated text processing function for such purposes as text entry, navigation, and editing. FIG. 3A-E shows various movements of a multifunctional text control knob according to one specific embodiment of the present invention.

Figure 3A:
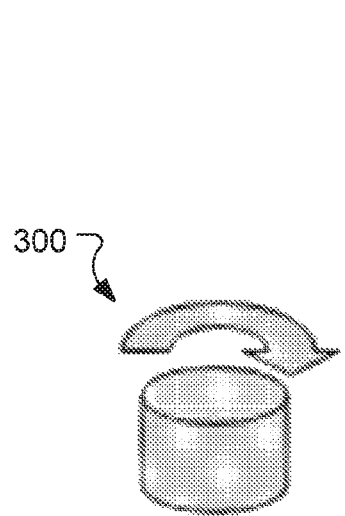
FIG. 3A-E shows various movements of a multifunctional text control knob according to an embodiment of the present invention.
Figure 3B:
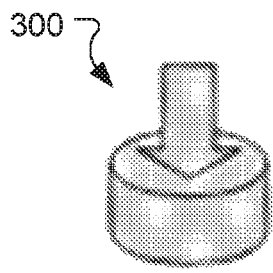
Figure 3C:
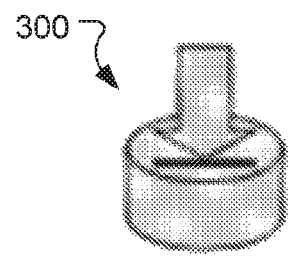
Figure 3D:
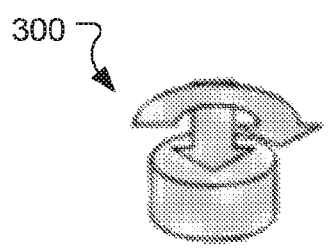
Figure 3E:
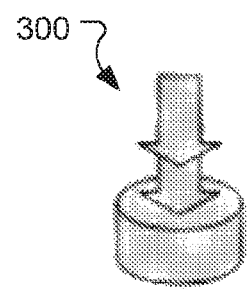

FIG. 3A illustrates rotation of a text control knob 300 for scrolling to navigate the active position of the text cursor through text to the next or previous text item, depending on the type of browsing unit (phrase, word, or character). FIG. 3B illustrates a single short push movement of the text control knob 300 to delete text at the active position. FIG. 3C shows a stationary long push movement of the text control knob 300 while not scrolling to undo or redo an immediately previous text processing operation. Using a single-level undo history, the first long push performs undo, the subsequent push performs redo (to undo the effect of undo), the next long push again performs undo, etc. FIG. 3D shows a scrolling and pushing movement of the text control knob 300 to replace text at the active position with alternate text, for example, a next or previous alternate phrase based on the ASR recognition result content or based on alternate phrases originating from other sources such as an auto-completion or auto-correction model. Alternatively, this "scrolling-when-pushed" movement could be also used to select more text units on the right or left of the active text unit, making the resulting selection of text units available for possible subsequent editing commands (such as deletion, case change, alternate phrase selection). FIG. 3E shows a double push movement of the text control knob 300 to toggle the type of text size of the text browsing/editing unit between phrase, word and character. If a double push movement is used, the effects of an immediately preceding single short push may be undone as part of the double push event processing.

It also may be useful to include a push-to-talk (PTT) button—for example, on the steering wheel—that is pressable to enable voice input associated with the text display arrangement. For example, the PTT button may be used to activate recording and recognition of spoken commands and dictated text. Optionally, a long press of the speech button may be used to toggle the text size of the browsing/editing unit between phrase, word and character instead of double clicking the text control knob 300 (e.g. in the case when physical parameters of the knob do not allow for easy double-clicking). Alternatively, or in addition, the selection of browsing unit type can be accomplished using voice commands (e.g. "phrase/word/spell mode"), and the toggle functionality may therefore remain unassigned to any physical control.

Embodiments of the invention may be implemented in whole or in part in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. In an automobile, a text display arrangement comprising:
   a text display, positioned in the automobile without impairing forward visual attention of a driver, for displaying to the driver a cursor and a subsequence of a sequence of words, the subsequence having a maximum length and including an active word, the cursor for indicating either the active word or a boundary thereof;
   a control for providing a control input by an occupant of the automobile; and
   a text processing application in communication with the text display and the control, the text processing application for controlling the display of words by:
      in response to receiving from the control an input to adjust the cursor: (a) updating the cursor to indicate a new active word within the sequence, or a boundary thereof, and (b) displaying by the text display the cursor and a second subsequence of the sequence of words, the second subsequence determined based upon the new active word and the maximum length; and
      in response to receiving from the control an input comprising at least one new word, either: (a) replacing the active word with the at least one new word, if the cursor indicates the active word, or (b) inserting the at least one new word between the active word and an adjacent word, if the cursor indicates a boundary between the active word and the adjacent word.

2. A text display arrangement according to claim 1, wherein the active word is displayed using a larger font than for other words in the subsequence.

3. A text display arrangement according to claim 1, wherein the maximum length of the subsequence comprises five words.

4. A text display arrangement according to claim 1, further comprising a secondary text display, positioned to one side of the driver, for displaying the sequence of words and the cursor in a manner synchronized with displaying the subsequences of words and the cursor by the first text display.

5. A text display arrangement according to claim 1, wherein the text processing application is configured, when the input comprises a navigation operation that followed either a non-navigation operation, or a prior navigation operation in a different direction, to update the cursor to indicate a boundary of the active word.

6. A text display arrangement according to claim 1, wherein the text processing application is configured, when the input comprises the at least one new word, (a) to designate the at least one new word as the active word, and (b) after either replacing or inserting the at least one new word, to update the cursor to indicate a boundary of the active word.

7. A text display arrangement according to claim 1, wherein the control comprises a multifunction knob or a speech recognition system.

8. A method of displaying text to a driver of an automobile, the method comprising:

displaying by a text display, positioned in the automobile without impairing forward visual attention of the driver, a cursor and a subsequence of a sequence of words, the subsequence having a maximum length and including an active word, the cursor for indicating either the active word or a boundary thereof;

in response to receiving, from an occupant of the automobile, an input to adjust the cursor: (a) updating the cursor to indicate a new active word within the sequence, or a boundary thereof, and (b) displaying by the text display the cursor and a second subsequence of the sequence of words, the second subsequence determined based upon the new active word and the maximum length; and in response to receiving, from an occupant of the automobile, an input comprising at least one new word, either: (a) replacing the active word with the at least one new word, if the cursor indicates the active word, or (b) inserting the at least one new word between the active word and an adjacent word, if the cursor indicates a boundary between the active word and the adjacent word.

9. A method according to claim 8, further comprising, when the input comprises a navigation operation that followed either a non-navigation operation, or a prior navigation operation in a different direction, updating the cursor to indicate a boundary of the active word.

10. A method according to claim 8, further comprising, when the input comprises the at least one new word, (a) designating the at least one new word as the active word, and (b) after either replacing or inserting the at least one new word, updating the cursor to indicate a boundary of the active word.

11. A method according to claim 8, further comprising audibly indicating the boundary between the active word and the adjacent word using a text-to-speech system.

12. A method according to claim 8, wherein the cursor indicates either an active word or a boundary based, at least in part, upon a recent input to adjust the cursor.

13. A method according to claim 8, further comprising displaying the sequence of words and the cursor, by a second text display positioned to one side of a driver, in a manner synchronized with displaying the subsequences of words and the cursor by the first text display.

14. A method according to claim 13, further comprising displaying, by the second text display, an operational status of the first and second text displays.

15. A tangible, computer-readable storage medium in which is non-transitorily stored computer program code that, when executed by a computing processor, performs a method of processing text that has been converted from speech into a sequence of words by a speech recognition apparatus in an automobile, the method comprising:

displaying by a text display, positioned in the automobile without impairing forward visual attention of the driver, a cursor and a subsequence of a sequence of words, the subsequence having a maximum length and including an active word, the cursor for indicating either the active word or a boundary thereof;

in response to receiving, from an occupant of the automobile, an input to adjust the cursor: (a) updating the cursor to indicate a new active word within the sequence, or a boundary thereof, and (b) displaying by the text display the cursor and a second subsequence of the sequence of words, the second subsequence determined based upon the new active word and the maximum length; and in response to receiving, from an occupant of the automobile, an input comprising at least one new word, either: (a) replacing the active word with the at least one new word, if the cursor indicates the active word, or (b) inserting the at least one new word between the active word and an adjacent word, if the cursor indicates a boundary between the active word and the adjacent word.

16. A storage medium according to claim 15, the method further comprising, when the input comprises a navigation operation that followed either a non-navigation operation, or a prior navigation operation in a different direction, updating the cursor to indicate a boundary of the active word.

17. A storage medium according to claim 15, the method further comprising, when the input comprises the at least one new word, (a) designating the at least one new word as the active word, and (b) after either replacing or inserting the at least one new word, updating the cursor to indicate a boundary of the active word.

18. A storage medium according to claim 15, the method further comprising audibly indicating the boundary between the active word and the adjacent word using a text-to-speech system.

19. A storage medium according to claim 15, wherein the cursor indicates either an active word or a boundary based, at least in part, upon a recent input to adjust the cursor.

20. A storage medium according to claim 15, the method further comprising displaying the sequence of words and the cursor, by a second text display positioned to one side of a driver, in a manner synchronized with displaying the subsequences of words and the cursor by the first text display.

21. A storage medium according to claim 20, the method further comprising displaying, by the second text display, an operational status of the first and second text displays.

* * * * *